(12) United States Patent
Arakawa et al.

(10) Patent No.: US 9,888,154 B2
(45) Date of Patent: Feb. 6, 2018

(54) INFORMATION PROCESSING APPARATUS, METHOD FOR PROCESSING INFORMATION, AND COMPUTER PROGRAM

(71) Applicant: CANON KABUSHIKI KAISHA, Tokyo (JP)

(72) Inventors: Junya Arakawa, Nagareyama (JP); Ritsuko Otake, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/208,434

(22) Filed: Jul. 12, 2016

(65) Prior Publication Data
US 2017/0019569 A1  Jan. 19, 2017

(30) Foreign Application Priority Data
Jul. 13, 2015 (JP) .................. 2015-140041

(51) Int. Cl.
| | |
|---|---|
| G06K 15/00 | (2006.01) |
| H04N 1/40 | (2006.01) |
| H04N 1/62 | (2006.01) |
| H04N 1/60 | (2006.01) |
| H04N 1/58 | (2006.01) |

(52) U.S. Cl.
CPC .............. H04N 1/62 (2013.01); H04N 1/58 (2013.01); H04N 1/6027 (2013.01)

(58) Field of Classification Search
None
See application file for complete search history.

(56) References Cited

U.S. PATENT DOCUMENTS

| | | |
|---|---|---|
| 6,618,171 B1 | 9/2003 | Tse et al. |
| 7,551,334 B2 | 6/2009 | Li |
| 7,880,924 B2 | 2/2011 | Lowman et al. |
| 8,384,952 B2 | 2/2013 | Hayasaki |

(Continued)

FOREIGN PATENT DOCUMENTS

| | | |
|---|---|---|
| EP | 0803842 A2 | 10/1997 |
| JP | 2012-095002 A | 5/2012 |

OTHER PUBLICATIONS

Lu, et al., "Binarization of Badly Illuminated Document Images through Shading Estimation and Compensation", Ninth International Conference on Document Analysis and Recognition, IEEE, Piscataway, NJ, USA, XP031157554, Sep. 1, 2007, pp. 312-316.

*Primary Examiner* — Helen Q Zong
(74) *Attorney, Agent, or Firm* — Canon USA, Inc. I.P. Divison

(57) ABSTRACT

An information processing method includes determining, in a luminance image that represents luminance components of an input image obtained by capturing a document image, a shaded region affected by shade and a specific pixel region including specific pixels less affected by the shade through a color of an object in the document image by using the luminance components of pixels of the luminance image, and generating a shade image that represents shade components of the input image by referring to pixel values of pixels adjacent to the specific pixels and repeating replacement processing of replacing a pixel value of each of the specific pixels with a value of the shaded region adjacent to the specific pixel until the specific pixel region disappears.

6 Claims, 12 Drawing Sheets

(56) References Cited

U.S. PATENT DOCUMENTS

| | | |
|---|---|---|
| 8,687,918 B2 | 4/2014 | Tamura |
| 2002/0006226 A1 | 1/2002 | Shiota |
| 2003/0210411 A1 | 11/2003 | Sawada |
| 2007/0002075 A1 | 1/2007 | Matsuda et al. |
| 2011/0142365 A1 | 6/2011 | Sakagami et al. |
| 2011/0274351 A1* | 11/2011 | Tsukada ................. H04N 1/628 382/167 |
| 2012/0141044 A1 | 6/2012 | Kwatra et al. |
| 2013/0322747 A1* | 12/2013 | Ozawa .................... H04N 1/58 382/164 |
| 2014/0247980 A1 | 9/2014 | Bvn |
| 2017/0019568 A1 | 1/2017 | Otake et al. |

* cited by examiner

FIG. 2A
FIG. 2B
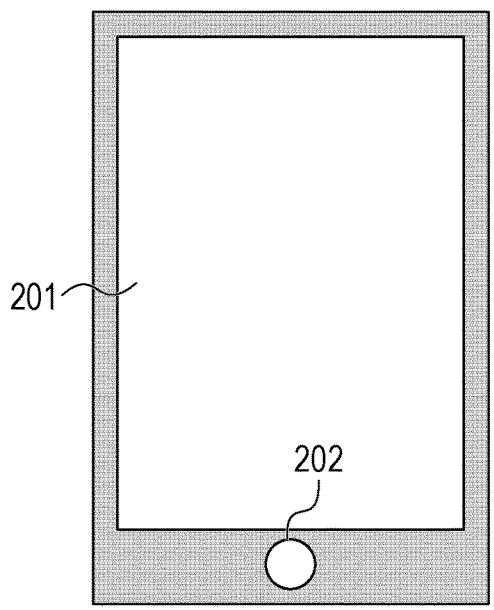
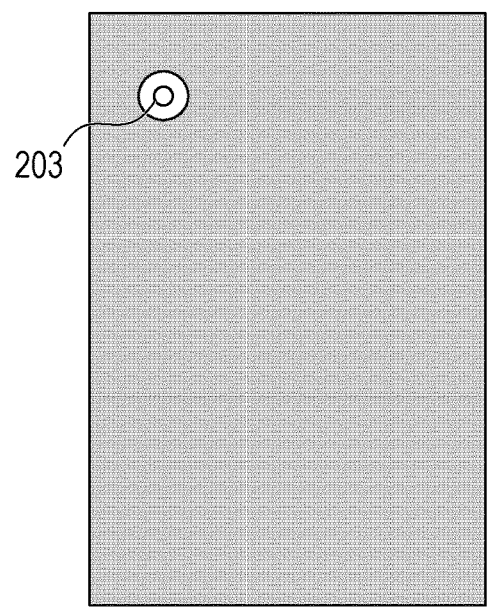

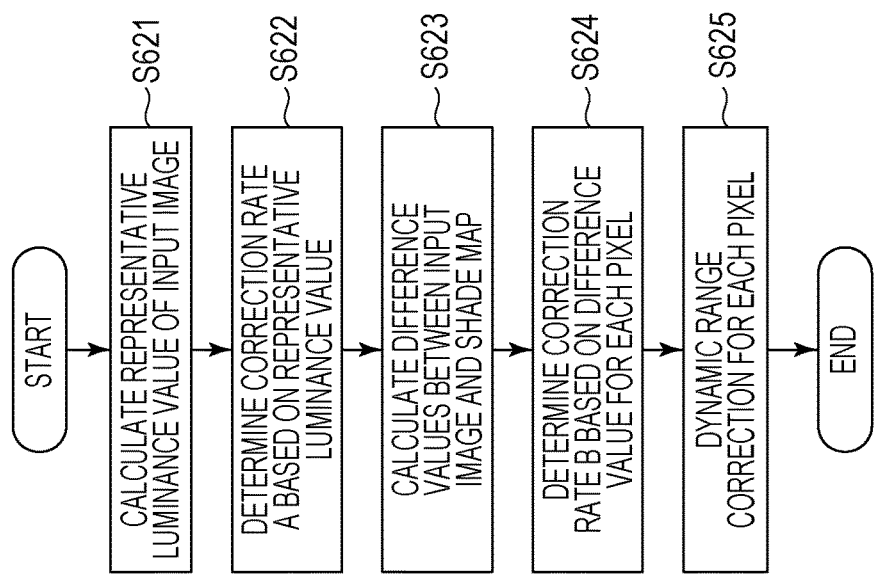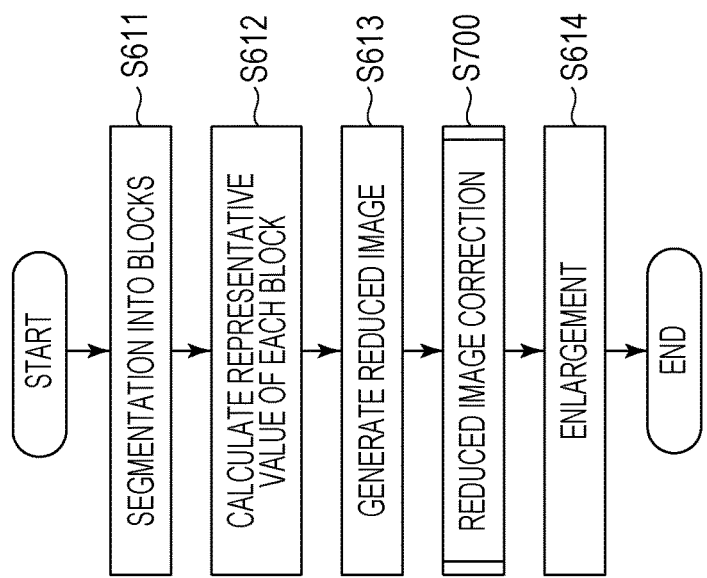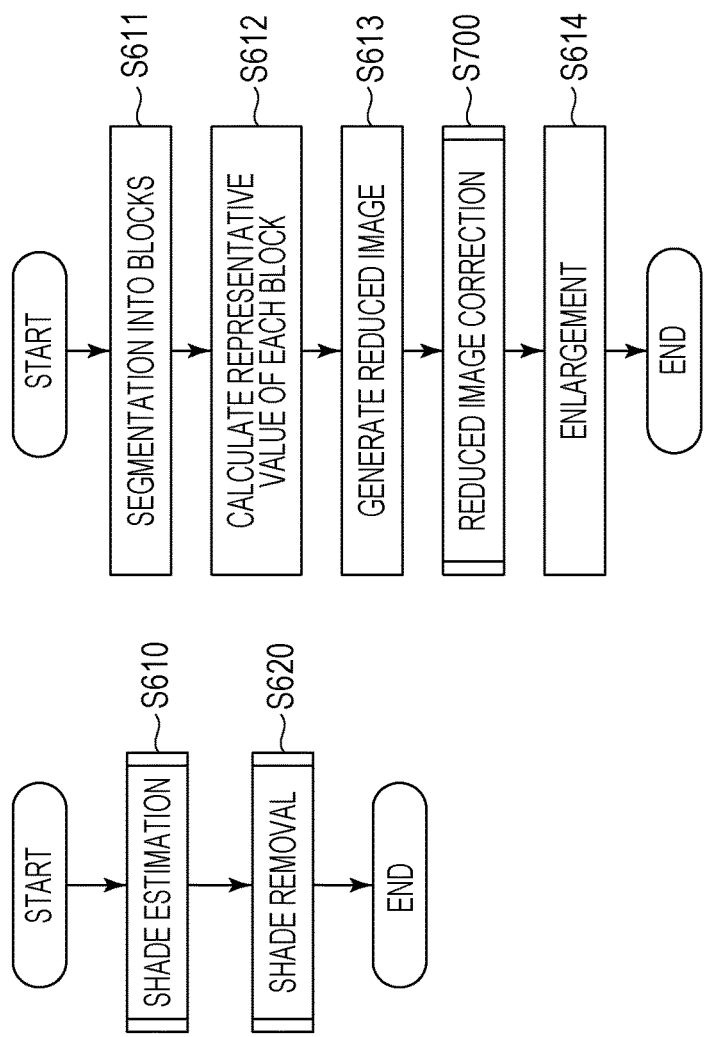

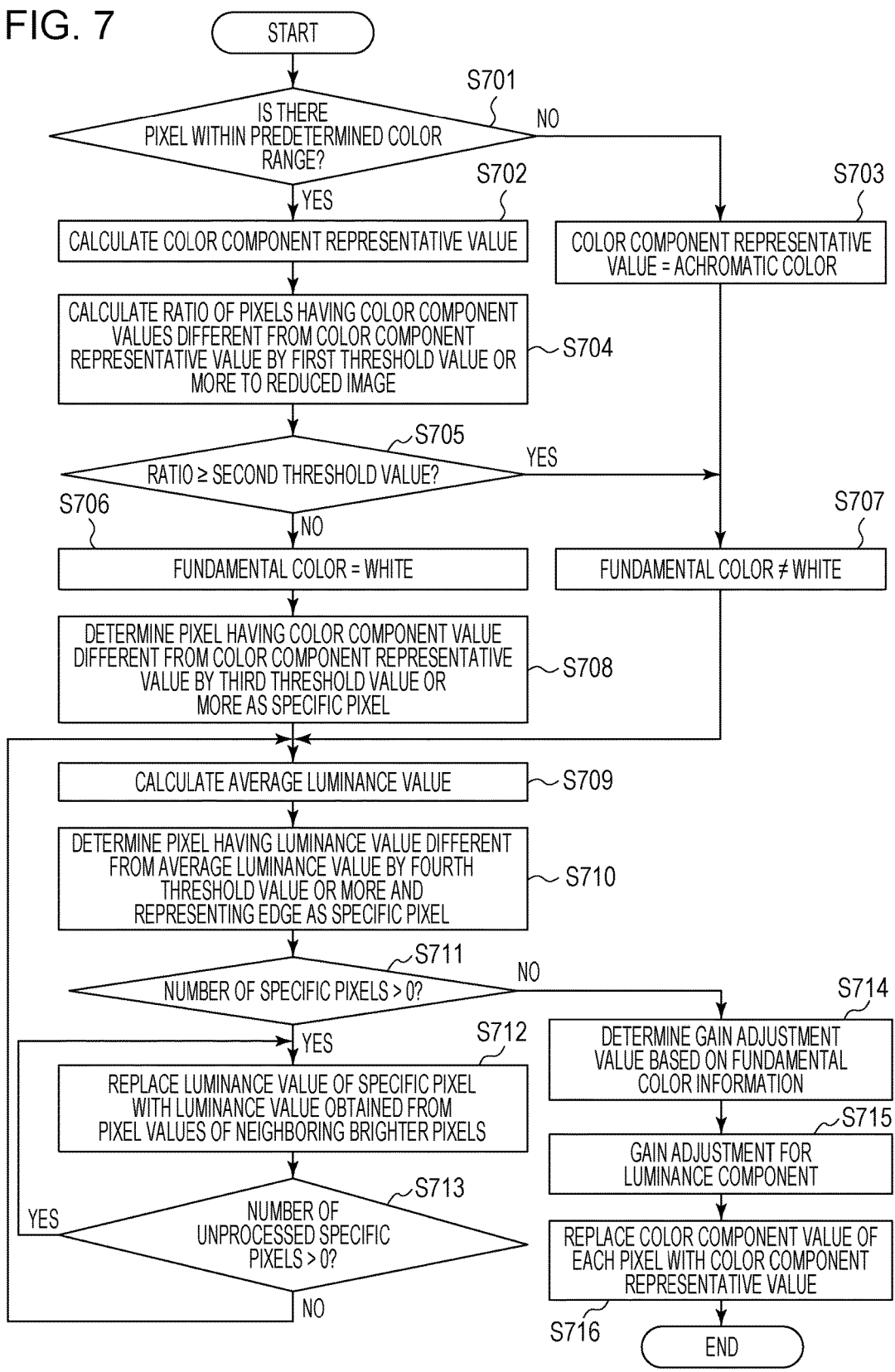

CORRECTION RATE A FOR ENTIRE IMAGE

REPRESENTATIVE LUMINANCE
VALUE OF INPUT IMAGE

CORRECTION RATE B FOR EACH PIXEL

DIFFERENCE VALUE BETWEEN PIXELS OF
INPUT IMAGE AND SHADE MAP

EDGE DETERMINATION
BY COMPARISON
WITH EIGHT PIXELS

EDGE DETERMINATION
BY COMPARISON
WITH FIVE PIXELS

EDGE DETERMINATION
BY COMPARISON
WITH THREE PIXELS

EDGE DETERMINATION
BY COMPARISON
WITH TWO PIXELS

EDGE DETERMINATION
BY COMPARISON
WITH ONE PIXEL

INFORMATION PROCESSING APPARATUS, METHOD FOR PROCESSING INFORMATION, AND COMPUTER PROGRAM

BACKGROUND OF THE INVENTION

Field of the Invention

The present disclosure relates to a technique for removing shade in a captured image.

Description of the Related Art

Mobile terminals, such as smartphones and tablet personal computers (PCs), having advanced information processing functions are becoming more and more popular nowadays. These mobile terminals have a camera and an image capture function. It is becoming increasingly common to capture an image of a document on a paper medium using such a camera function of a mobile terminal, and store image data of the captured image into a memory of the mobile terminal. Additionally, the combination of a mobile terminal and a printer is increasingly used to copy a document. For example, image data of a captured image is transmitted from the mobile terminal to the printer and the image is printed by the printer. If a user does not have a multifunction machine having a scanner function and a printer function, the user can copy a document using a mobile terminal and a printer in the above-described manner.

When a user captures an image of a document using a camera function of a mobile terminal, an object adjacent to the document or the user may cast shade on the document. If the user captures an image of the shaded document, the captured image may be shaded. Uneven brightness of the captured image caused by the shade will be referred to as "shade" hereinafter. The readability of the document in the shaded image is low. This leads to a reduction in quality of a printed image.

Japanese Patent Laid-Open No. 2012-95002 discloses a method for correcting shade in a document image captured with a camera. As described in Japanese Patent Laid-Open No. 2012-95002, shade components of the captured image are estimated, and the shade components are removed from the captured image based on information about the estimated shade components.

According to the method disclosed in Japanese Patent Laid-Open No. 2012-95002, however, if a document includes an object having a large area, estimated shade components will be affected by the object. This will result in a reduction in accuracy of shade estimation in the captured image. Specifically, the method disclosed in Japanese Patent Laid-Open No. 2012-95002 includes segmenting a captured image into a plurality of blocks, obtaining a color representative value of each of the blocks, and estimating shade based on the obtained values. A shade estimated value having a difference from those of neighboring blocks is replaced with a value obtained from the shade estimated values of the neighboring blocks. This method is advantageous when the size of an object is substantially equal to one block. If an object corresponds to multiple blocks, effects of the object cannot be eliminated in shade estimation.

SUMMARY OF THE INVENTION

The present disclosure provides an information processing method including determining, in a luminance image that represents luminance components of an input image obtained by capturing a document image, a shaded region affected by shade and a specific pixel region including specific pixels less affected by the shade through a color of an object in the document image by using the luminance components of pixels of the luminance image, and generating a shade image that represents shade components of the input image by referring to pixel values of pixels adjacent to the specific pixels and replacing a pixel value of each of the specific pixels with a value of the shaded region adjacent to the specific pixel. In the generating, replacing a pixel value of each of the specific pixels with the value of the adjacent shaded region is repeated until the specific pixel region disappears in or from the luminance image.

According to other aspects of the present disclosure, one or more additional information processing methods, one or more information processing apparatuses, one or more computer programs and one or more storage mediums are discussed herein. Further features of the present disclosure will become apparent from the following description of exemplary embodiments with reference to the attached drawings.

BRIEF DESCRIPTION OF THE DRAWINGS

FIGS. 2A and 2B are external views of a mobile terminal.

FIGS. 6A to 6C are flowcharts illustrating an overall process in a first embodiment.

FIG. 7 is a flowchart illustrating a reduced image correction process in the first embodiment.

DESCRIPTION OF THE EMBODIMENTS

First Embodiment

A first embodiment of the present disclosure will be described below with reference to the drawings.

Figure 1:
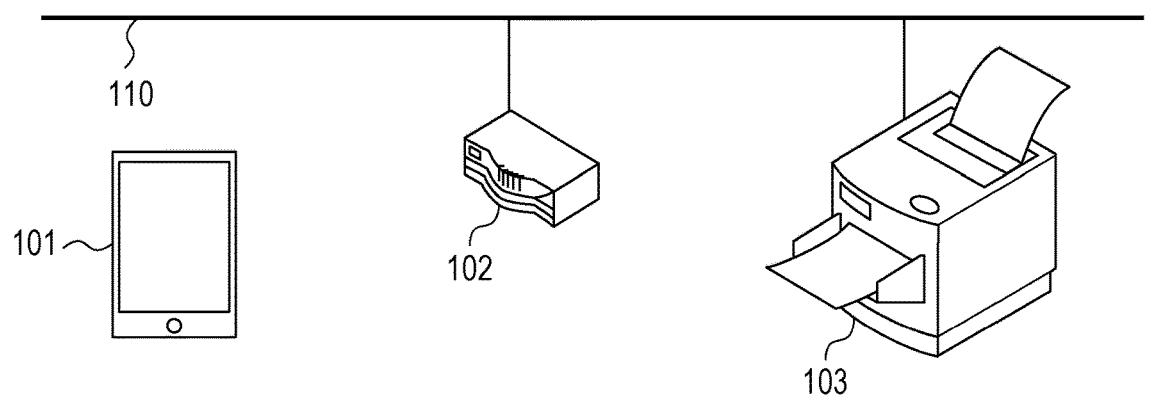
FIG. 1 is a schematic diagram of an exemplary configuration of a system in an embodiment of the present disclosure.

FIG. 1 illustrates an overall configuration of a system in the first embodiment. A wireless router 102 and a printer 103 are connected to a local area network (LAN) 110. A mobile terminal 101 can be connected to the printer 103 via the wireless router 102 and the LAN 110. Although the mobile terminal 101 is described as an example of an information processing apparatus in the present embodiment, the information processing apparatus may be, for example, a PC, a printer, or a copier. In the copier, instead of a camera, a scanner is used to obtain an image by scanning a document.

<Configuration of Mobile Terminal>

FIGS. 2A and 2B are external views of the mobile terminal 101 in the present embodiment. The mobile terminal 101 may be any of a variety of types. FIG. 2A illustrates a front surface of the mobile terminal 101. The mobile terminal 101 includes a touch panel display 201 and an operation button 202 arranged in the front surface. Specifically, the touch panel display 201 is a combined device of a display device for displaying, for example, information, a button, and an image necessary for an operation, and a position input device for receiving an input in response to a touch of a human finger or the like. FIG. 2B illustrates a rear surface of the mobile terminal 101. The mobile terminal 101 includes an image capture unit 203 disposed in the rear surface. The present embodiment is applicable to any mobile terminal that has a camera function including the image capture unit 203. Specifically, the present embodiment is applicable to a smartphone or mobile phone having a camera function and a digital camera having a communication function. Furthermore, the present embodiment is applicable to a document camera that captures an image of a document in a contactless manner.

Figure 3:
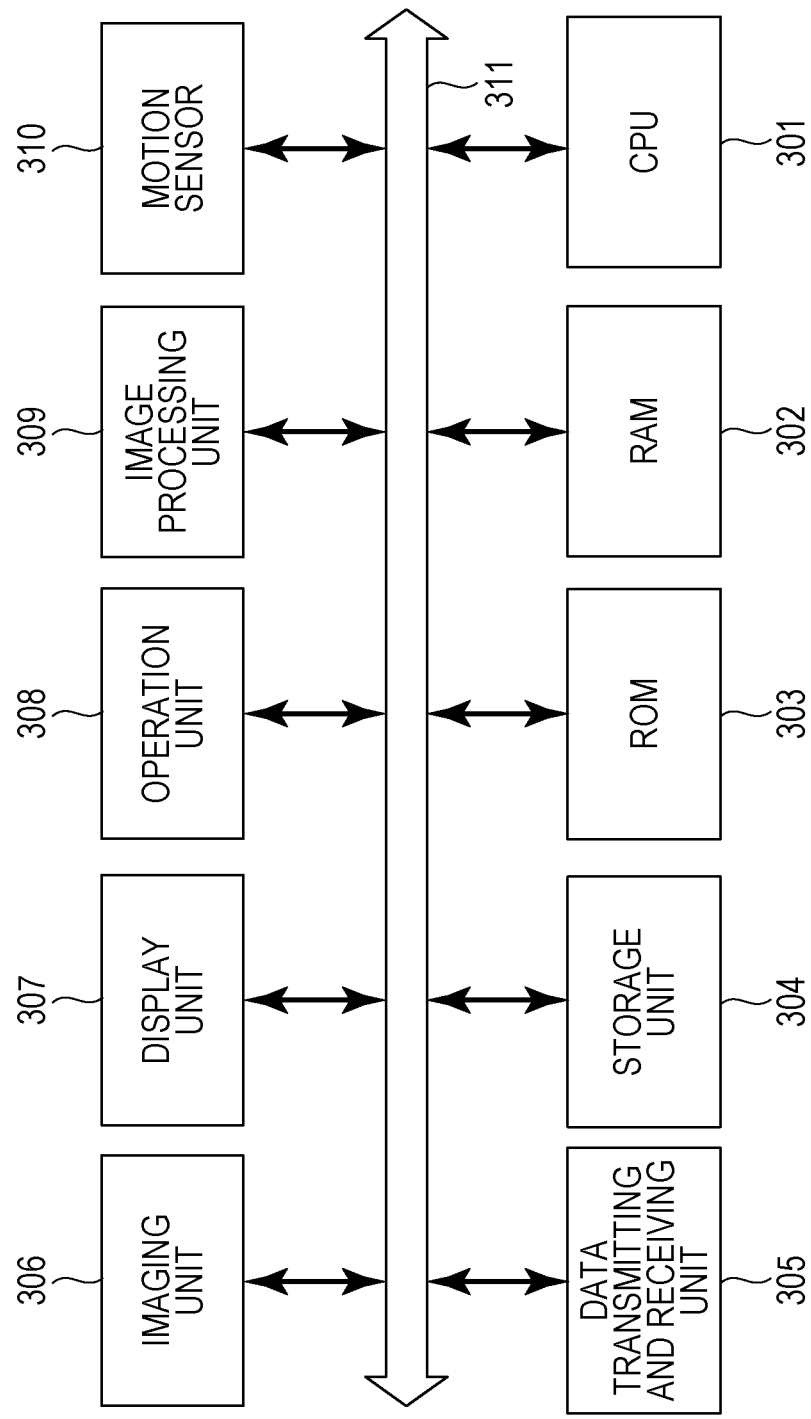
FIG. 3 is a block diagram of an exemplary configuration of the mobile terminal.

FIG. 3 is a block diagram illustrating an exemplary configuration of the mobile terminal 101 in this embodiment. In FIG. 3, a central processing unit (CPU) 301, a random access memory (RAM) 302, and a read-only memory (ROM) 303 transmit and receive programs and data to and from each other through a data bus 311. The data bus 311 is connected to a storage unit 304, a data transmitting and receiving unit 305, an imaging unit 306, a display unit 307, an operation unit 308, an image processing unit 309, and a motion sensor 310. The CPU 301, the RAM 302, the ROM 303, the storage unit 304, the data transmitting and receiving unit 305, the imaging unit 306, the display unit 307, the operation unit 308, the image processing unit 309, and the motion sensor 310 transmit and receive programs and data to and from each other.

The storage unit 304, which is a flash memory, stores image data and various programs. The data transmitting and receiving unit 305 includes a wireless LAN controller and transmits and receives data to and from the printer 103 via the wireless router 102. The imaging unit 306, which corresponds to the above-described image capture unit (camera) 203, captures an image of a document to obtain image data. The obtained image data is processed by the image processing unit 309 or the CPU 301 through the storage unit 304 or the RAM 302. The processed image data is subjected to post-processing by the CPU 301. For example, the image data can be transmitted to the display unit 307 and an image based on the data is displayed by the display unit 307. The image data can be stored in the storage unit 304. The image data can be transmitted to an external device through the data transmitting and receiving unit 305.

The display unit 307 is included in the above-described touch panel display 201. The display unit 307 displays, for example, a live view image of a document to be captured as an image using the camera function, an image processing result in this embodiment, information necessary for notification about a process, and information necessary for an operation. The operation unit 308 includes a touch panel, which is included in the touch panel display 201, and the operation button 202. The operation unit 308 receives a user operation and transmits information about the operation to the units related to the operation. The motion sensor 310 includes a three-axis acceleration sensor, an electromagnetic compass, and a three-axis angular velocity sensor. The motion sensor 310 can detect the orientation or movement of the mobile terminal 101 using a well-known technique.

The CPU 301 runs a program stored in the ROM 303 or the storage unit 304, thus controlling the components in the mobile terminal 101.

<Configuration of Printer>

Figure 4:
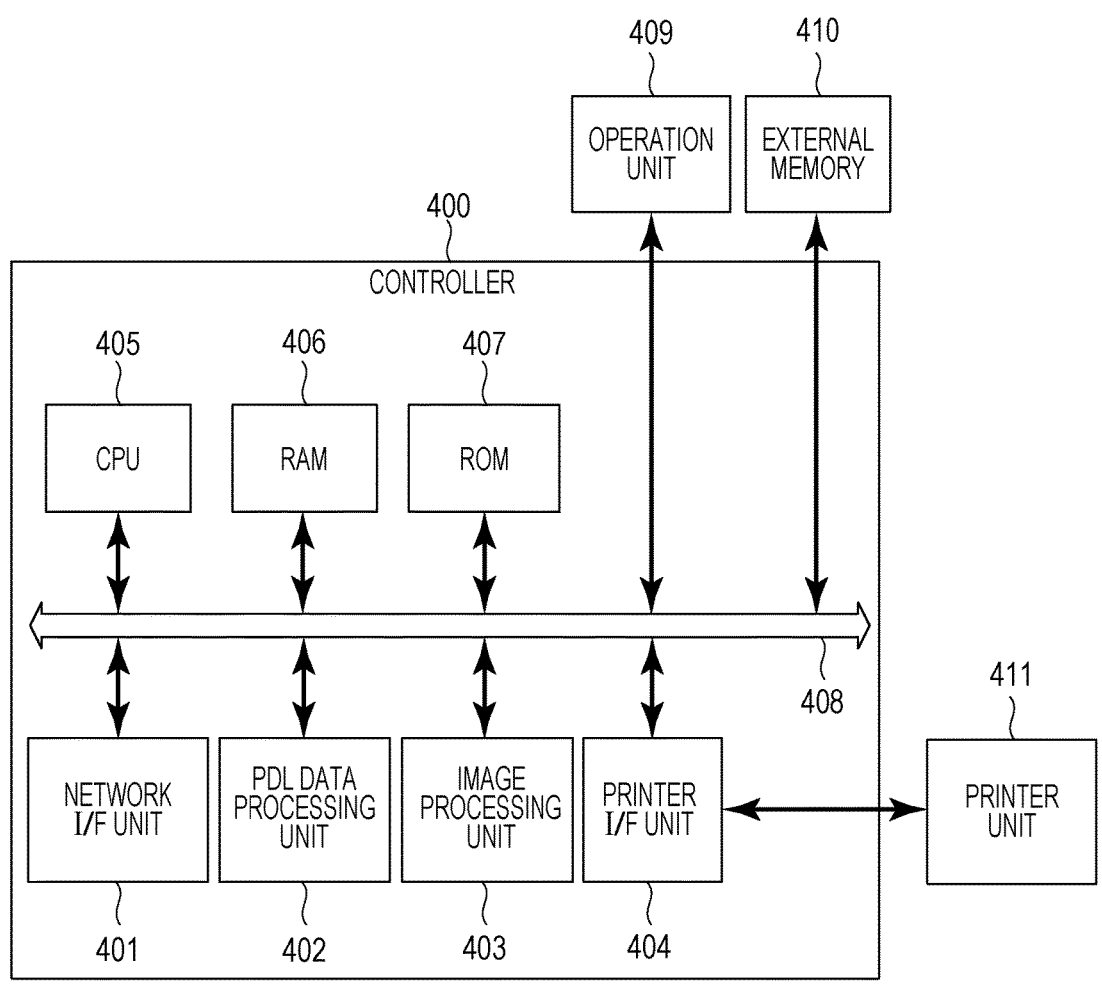
FIG. 4 is a block diagram of an exemplary configuration of a printer.

FIG. 4 is a diagram explaining an exemplary configuration of the printer 103 in the embodiment. The printer 103 includes a controller 400, an operation unit 409, an external memory 410, and a printer unit 411. The controller 400 outputs an image signal to the printer unit 411 via a printer interface (I/F) unit 404 connected to a system bus 408 in accordance with, for example, a control program. The control program is stored in a ROM 407 or the external memory 410. The ROM 407 further stores, for example, a control program for a CPU 405. The CPU 405 can communicate with the mobile terminal 101 via a network I/F unit 401 and the LAN 110. This configuration allows the printer 103 to transmit information in the printer to the mobile terminal 101 and receive, for example, image data obtained by the mobile terminal 101 from the mobile terminal 101. A RAM 406 functions as a main memory for the CPU 405 and a work area, for example.

Processed image data, indicating a captured image, transmitted from the mobile terminal 101 is supplied to the controller 400 via the network I/F unit 401. Then, a page description language (PDL) data processing unit 402 performs PDL interpretation and rendering, an image processing unit 403 performs print output image processing, and the printer unit 411 prints an image based on the processed image data.

<Detailed Description of Process>

FIGS. 6A, 6B, and 6C are flowcharts explaining a process for correcting an input image in the embodiment. The process in FIGS. 6A to 6C is executed by the mobile terminal 101 (information processing apparatus). A program for the process in FIGS. 6A to 6C is stored in the ROM 303. The CPU 301 reads the stored program and runs the program in the RAM 302, so that the process illustrated by the flowcharts in FIGS. 6A to 6C is executed.

Figure 5C:
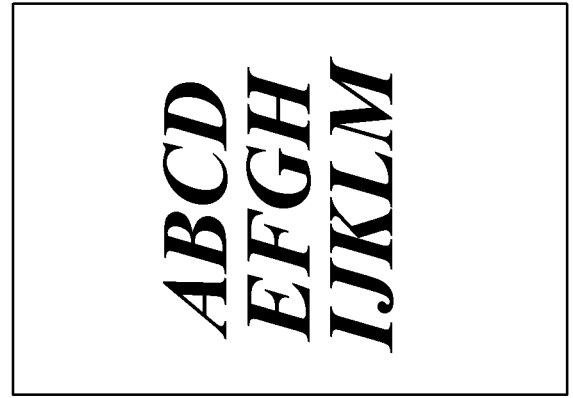
FIGS. 5A to 5C are diagrams illustrating a process in the present disclosure.
Figure 5B:
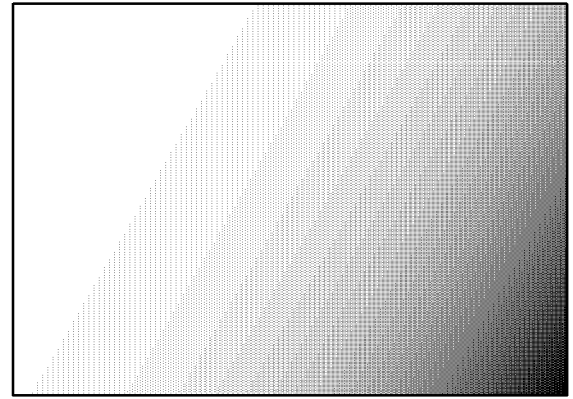
Figure 5A:
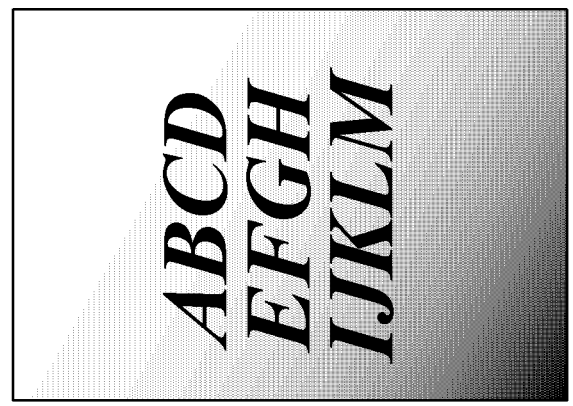

FIG. 6A depicts the flowchart of the overall process for correcting an input image. The process is started when a document image captured with the camera function including the image capture unit 203 of the mobile terminal 101, an image stored in the storage unit 304, or an image received from the external device is acquired as an input image. The process is performed on the assumption that the input image includes a document. If the input image includes a background region other than the document, a document region may be detected, the detected document region may be subjected to projective transformation such that the document region is transformed into a rectangular region, and the resultant region may be processed as an input image. FIG. 5A is an example of an input image. As seen in FIG. 5A, the input image has shade in the background of character strings.

In step S610, the image processing unit 309 processes the input image to estimate shade components, which depend on an image capture environment, of the input image. The shade estimation will be described in detail later with reference to the flowcharts of FIGS. 6B and 7. FIG. 5B illustrates an example of the estimated shade components of the input image in FIG. 5A. As seen in FIG. 5B, only the shade components other than character regions are estimated.

In step S620, the image processing unit 309 removes the shade components from the input image based on information about the estimated shade components. The shade removal will be described in detail later with reference to the flowchart of FIG. 6C. FIG. 5C illustrates an example of an image obtained by removing the shade components based on the information about the shade components (FIG. 5B)

estimated in the input image of FIG. 5A. Since the shade components are correctly estimated, the shade can be removed without any problems as seen in FIG. 5C.

FIG. 6B is the flowchart explaining the shade estimation process.

In step S611, the image processing unit 309 segments the input image into a plurality of blocks. In this segmentation, each block may have any shape and include any number of pixels. For example, each block may be a square such that the number of pixels arranged in a longitudinal direction of the block is the same as that in a lateral direction thereof. The number of blocks in each of the longitudinal and lateral directions of the input image may be determined such that the number of blocks ranges from 8 to 64. The number of blocks may be fixed or changed in accordance with input image conditions.

In step S612, the image processing unit 309 calculates a representative pixel value of each of the blocks obtained by segmentation. The representative pixel value is a pixel value of an RGB signal (image data represented by three color channels of red, green, and blue). To determine the representative pixel value, pixels having high luminance values are selected from input pixels included in the block and the selected pixels are used. The luminance value in this case is, for example, a Y signal in the YCbCr color space converted from the RGB color space. An L signal in the L*a*b* color space or a Y signal in the YUV color space may be used as a luminance value. The term "paper white region" as used herein refers to a region that serves as a blank region, where a blank sheet is exposed as a background, of a document. When the block includes a paper white region, the representative pixel value indicates a shade-component estimated value. The paper white region is ideally white (for 8-bit signals, R=255, G=255, and B=255). In the input image obtained by capturing an image of a document through the camera, if a paper white region is shaded, the region will not be white. In other words, pixel values of the paper white region are considered to indicate shade components. If a region other than the paper white region is shaded, the region will be darker than the paper white region. If a block includes a paper white region, therefore, a region having relatively high luminance values in the block will be estimated as a paper white region. Calculating a representative pixel value in this region can estimate shade components in the block. If the block includes no paper white region, the representative pixel value of the block will be a pixel value of the brightest object region shaded.

Examples of methods for calculating a representative pixel value of each block include a method for calculating luminance values of input pixels in each block and setting the highest luminance value to a representative pixel value of the block, a method for selecting a predetermined number of pixels of each block in the order from higher to lowest luminance values, calculating an average luminance value of these pixels, and setting the average luminance value to a representative pixel value, and a method for selecting pixels having luminance values within a predetermined range from the highest luminance value in each block or selecting pixels using a luminance value histogram, calculating an average value of pixel values of the selected pixels, and setting the average value to a representative pixel value. As a method for estimating shade components in each block, a method for clustering RGB signals in each block into clusters, calculating a cluster representative value of each of the clusters, and setting a cluster representative value having the highest luminance value to a representative pixel value may be used, though the amount of calculation in this method is large.

After the representative pixel values of all of the blocks are obtained in the above-described manner, the image processing unit 309 generates an RGB image composed of the representative pixel values of the blocks in step S613. This image composed of the representative pixel values of the blocks is a reduced image obtained by reducing the input image such that the number of pixels of the reduced image is determined by the number of blocks in the above-described segmentation. This reduced image serves as a base image to be subjected to the shade estimation process. In step S700, the image processing unit 309 performs correction processing to leave the shade components in the reduced image, serving as the base image. The reduced image correction processing will be described in detail later with reference to FIG. 7. In step S614, the image processing unit 309 enlarges the reduced image subjected to the correction processing to generate a shade map having the same size as that of the input image. The shade estimation process is terminated.

FIG. 6C is the flowchart explaining the process of removing the shade from the input image using the above-described shade map.

In step S621, the image processing unit 309 calculates a representative luminance value as a brightness component of the input image. An average value or a median value of luminance values calculated from pixels of the reduced image is determined as the representative luminance value. The representative luminance value, serving an image-background estimated value, can be calculated more accurately from the reduced image than from the input image because the reduced image is less affected by an object than the input image. In addition, the amount of calculation for the reduced image is smaller than that for the input image.

In step S622, the image processing unit 309 refers to a table stored in the storage unit 304 to determine a correction rate A associated with the representative luminance value. The correction rate A is a numeric value to be applied to the entire image. A low representative luminance value means that the input image is darker than the shade components due to an object included in the document or the background and that the document may include no or little paper white region. In such a case, a pixel value of the background or the object in the document may be used as a shade-component estimated value, the accuracy of shade component estimation may be reduced accordingly, and darker shade components (shade map) may be estimated. If correction is performed using such a shade map, overcorrection would be caused. For this reason, when the representative pixel value is low, the correction rate is reduced. This prevents overcorrection.

Figure 8A:
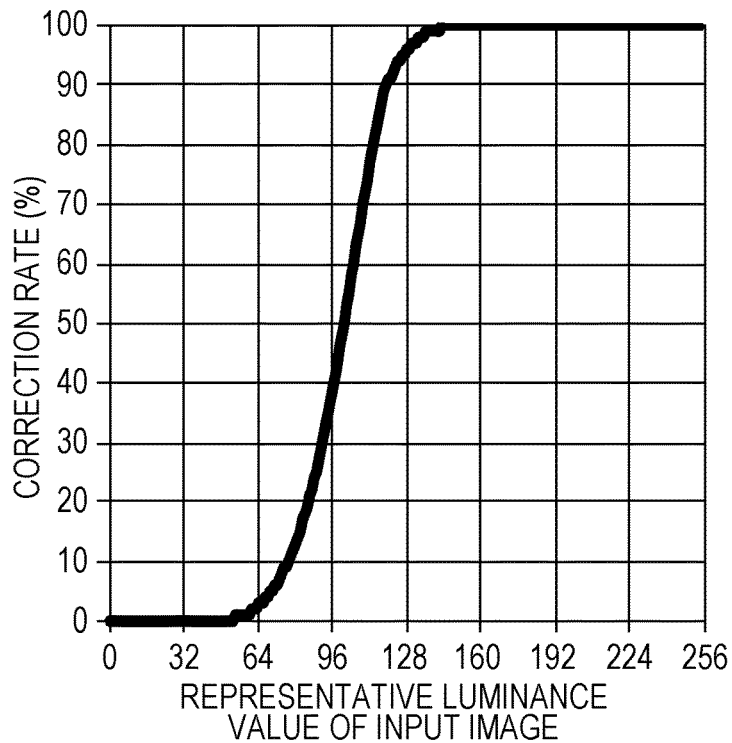
FIGS. 8A and 8B illustrate exemplary look-up tables (LUTs) for correction rate adjustment.

FIG. 8A illustrates an exemplary graph that represents the table referred in step S622. The axis of ordinates of the graph represents the correction rate to be applied to the shade components estimated in the shade removal process. For example, when a representative luminance value of the input image is 32, namely, the input image is very dark, the correction rate is 0%. This means that correction (shade removal) is not performed regardless of a state of the shade map. As described above, if the representative luminance value is very low, there is a high possibility that the estimated shade components (shade map) may include shade components in a dark background. In this case, the shade removal process is not performed, thus preventing correction such that the dark background turns to white.

In step S623, the image processing unit 309 calculates a difference between a value of a target pixel included in the input image and a value of a corresponding pixel in the shade map located at the same coordinates as those of the target pixel such that the difference is obtained for each of pixels of the input image. In this embodiment, it is assumed that the input image and the shade map for difference calculation are in the RGB image format. The difference is calculated for each of R, G, and B channels. For example, it is assumed that a pixel value (of a target pixel) at certain coordinates in the input image is indicated by (Rin (red component), Gin (green component), Bin (blue component)) and a pixel value at the same coordinates in the shade map is indicated by (Rmap (red component), Gmap (green component), Bmap (blue component)). Difference values obtained are |Rin−Rmap|, |Gin−Gmap|, and |Bin−Bmap|. The symbol |*| denotes an absolute value. Since only one difference value is used, the largest value of the difference values of R, G, and B components is selected and the selected difference value is used as a difference value associated with the target pixel. As a method for obtaining a difference value, RGB values of the input image and those of the shade map may be converted into values for the L*a*b* color space and a color difference ΔE may be obtained for each pixel, though the amount of calculation is large.

Figure 8B:
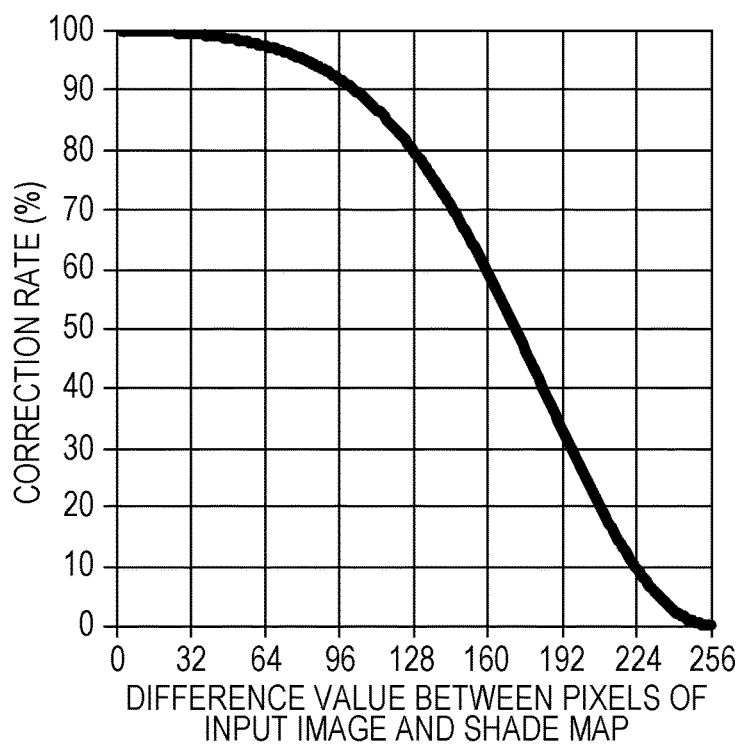

In step S624, the image processing unit 309 refers to a table stored in the storage unit 304 to determine a correction rate B associated with the difference value, or the correction rate B for the target pixel. The correction rate B is a numeric value that is determined in association with a difference value obtained for each pixel and is applied to the pixel. FIG. 8B illustrates an exemplary graph that represents the table referred in step S624. The axis of ordinates of the graph represents the correction rate to be applied to a shade component estimated in the shade removal process as in FIG. 8A. For example, when the difference value between a certain pixel in the input image and the corresponding pixel in the shade map is 128, the correction rate is 80%. When the difference value between the input image and the shade map is 128, it is estimated that the pixel is included in an object in the document, because the pixel value of the input pixel is significantly different from the pixel value of an estimated shade component. If the estimated shade component is simply corrected, the color of the object would probably be impaired. The correction rate for the shade component is therefore set to 80%. For example, when the difference value between a certain pixel in the input image and the corresponding pixel in the shade map is 0, the correction rate is 100%. In this case, it is estimated that there is no difference between the pixel value in the input image and the pixel value of a corresponding estimated shade component, namely, the pixel is included in a paper white portion of the document. The correction rate for the shade component is set to 100%.

FIG. 8B illustrates the relationship in which as the difference value between a pixel value of a pixel in the input image and that of the corresponding pixel in the shade map increases, the correction rate decreases. The relationship may be linear such that as the difference value increases, the correction rate linearly decreases.

In step S625, the image processing unit 309 performs correction to remove (whiten) a shade component in each of the pixels of the input image using the input image, the shade map, and the correction rates A and B. For correction to remove the shade components, the pixel values of the input image are corrected using the correction rates for the pixels of the input image and the pixel values of the shade map. Assuming that calculation is performed on 8-bit image data per channel, shade-map pixel component values based on the correction rate for a pixel k included in the input image are given by Expressions (1) and (2) as follows.

$$R'map(k) = 255 - (255 - Rmap(k)) \times \frac{A}{100} \times \frac{B(k)}{100} \quad (1)$$

$$G'map(k) = 255 - (255 - Gmap(k)) \times \frac{A}{100} \times \frac{B(k)}{100}$$

$$B'map(k) = 255 - (255 - Bmap(k)) \times \frac{A}{100} \times \frac{B(k)}{100}$$

Pixel component values of the pixel k are converted using these values as follows.

$$Rout(k) = Rin(k) \times \frac{255}{R'map(k)} \quad (2)$$

$$Gout(k) = Gin(k) \times \frac{255}{G'map(k)}$$

$$Bout(k) = Bin(k) \times \frac{255}{B'map(k)}$$

The above-described processing using these expressions allows pixel component values higher (brighter) than the pixel component values R'map(k), G'map(k), and B'map(k) to indicate 255. Each of the pixels in the input image is subjected to this processing, so that an image subjected to shade removal is output.

FIG. 7 is a flowchart explaining details of the reduced image correction process (S700).

In step S701, the image processing unit 309 determines the presence or absence of a pixel having a pixel value within a first color range in the reduced image. The term "first color range" as used herein refers to a range of colors considered to be indicated by pixel values obtained by capturing an image of a blank sheet under various conditions, or a range of colors considered to indicate a paper white portion. As regards a method for setting the color range, for example, in the use of the YCbCr color space, the first color range is within a predetermined distance, defined by a certain threshold value, from the value (Cb, Cr)=(0, 0) that indicates an achromatic color. If there is at least one pixel (having Cb and Cr values within the threshold distance from the achromatic color) within the first color range, the image processing unit 309 determines "YES" in step S701. If there is no pixel within the first color range, the image processing unit 309 determines "NO" in step S701.

In step S702, the image processing unit 309 calculates a color component representative value of the reduced image. The term "color component representative value" as used herein refers to a value that is estimated from an input image as a color component value obtained by capturing an image of a blank sheet. This value indicates a shade color component and also indicates a color to be converted into white by the shade removal process, which will be performed later. The color component representative value is calculated based on pixel values within the above-described first color range. In this case, an average of color component values within the first color range is defined as the color component representative value.

In step S704, the ratio of pixels having color component values different from the color component representative value calculated in step S702 by a first threshold value or more to the pixels of the reduced image is calculated. In other words, the ratio of a region that is not a paper white region to the input image is obtained. As regards the distance for color components, a distance in the Cb-Cr space may be used.

In step S705, the image processing unit 309 determines whether the ratio calculated in step S704 is greater than or equal to a second threshold value. If NO in step S705, or if the ratio of the paper white region to the input image exceeds a predetermined value, it can be estimated that the input image is obtained by capturing an image of a document whose background is white. Thus, the image processing unit 309 determines that a fundamental color of the input image is white (S706). If YES in step S705, or if the ratio of the region that is not the paper white region to the input image is greater than or equal to a predetermined value, it can be estimated that the document captured as an image does not have a white background, for example, the document is on a colored sheet or includes one or more chromatic color objects over a wide range. Thus, the image processing unit 309 determines that the fundamental color of the input image is not white (S707).

The case where the image processing unit 309 determines "NO" in step S701 will now be described. In step S703, the image processing unit 309 defines the color component representative value as the achromatic color ((Cb, Cr)=(0, 0)). The reason is as follows. Since a color component value obtained by capturing an image of a blank sheet cannot be estimated from the input image, color component conversion by the shade removal process is not performed. In addition, the input image in this case includes no paper white region. In step S707, the image processing unit 309 determines that the fundamental color of the input image is not white.

In step S708, the image processing unit 309 refers to color component values of all of the pixels of the reduced image to determine, as a specific pixel, a pixel having a color component value different from the color component representative value calculated in step S702 by a predetermined threshold value (third threshold value) or more. The term "specific pixel" as used herein refers to a pixel that represents a region other than a paper white region in the reduced image. The specific pixel is a pixel whose value is to be replaced by using a pixel estimated to represent a neighboring paper white region. In this step, a region having color component values significantly different from the representative value, namely, a region having a color distinctly different from a blank sheet is identified as a group of specific pixels.

In step S709, the image processing unit 309 calculates an average luminance value of the reduced image at this point.

In step S710, the image processing unit 309 refers to luminance component values of all of the pixels of the reduced image to determine whether a pixel having a luminance value different from the average luminance value, calculated in step S709, by a fourth threshold value or more is included in an edge of an object. Whether such a pixel is included in an edge may be determined by using any of known edge determination methods. In this determination, a pixel determined as an edge is a "dark edge" pixel (dark edge determination) because the pixel is darker than its neighboring pixels. As regards a pixel determined as a "bright edge" pixel (bright edge determination) because the pixel is brighter than its neighboring pixels, the bright edge pixel is ignored. The reason is that a region that is less likely to be a paper white region is considered to be darker than the paper white region. A pixel that has a luminance value different from the average luminance value by the fourth threshold value or more and that is determined as a dark edge pixel is determined as a specific pixel. The specific pixel in step S710 is an edge pixel that has a luminance value different from the average luminance value and luminance values of its neighboring pixels and that is less likely to represent the paper white region. The reason is that the paper white region is likely to have a small difference from the average luminance value and is also likely to have no rapid change in luminance because of the presence of only the shade component. The fourth threshold value may be zero and specific pixel determination may be performed only based on whether a target pixel is included in an edge.

In step S711, the image processing unit 309 determines the presence or absence of a specific pixel determined in steps S708 and S710. If YES, or it is determined that there is a specific pixel, the process proceeds to step S712.

In step S712, the image processing unit 309 replaces the luminance value of the specific pixel by a luminance value obtained from its neighboring pixels. This processing means replacement of the luminance value of the specific pixel, determined as being not included in the paper white region, with a luminance value calculated from its neighboring pixels estimated to be included in the paper white region. Actually, for example, a method may be used which includes selecting pixels that have higher luminance values than a processing target pixel by a predetermined value or more and that are not specific pixels from a plurality of pixels adjacent to the target pixel, calculating an average of the luminance values of the selected pixels, and determining the average as a luminance value for the target pixel. If there is no adjacent pixels to be selected, an unprocessed specific pixel, which is not subjected to replacement, will be left. This processing is repeated until there is no unprocessed specific pixel (step S713). A specific pixel may be left depending on conditions. In such a case, after the processing is repeated a predetermined number of times, replacement conditions may be changed so that the left specific pixel can be processed. For example, an average of luminance values of all of the adjacent pixels may be used as a luminance value for the processing target pixel.

In the above-described steps, the replacement of the luminance values of the pixels in the region distinctly different in color from a blank sheet and an edge region is complete. When the input image includes an object having a relatively large area, pixels in only the edge are subjected to replacement and pixels inside the object remain unprocessed. The process returns to step S709. In steps S709 and S710, specific pixel determination for an edge is again performed. In step S712, a luminance value of the determined specific pixel is subjected to replacement. By repeating these steps, the pixels corresponding to the object are subjected to replacement based on information about the paper white region surrounding the object. For the specific pixel determination in step S710, if there is no specific pixel to be subjected to replacement, it is determined as NO in step S711. The process proceeds to step S714. Alternatively, if the number of specific pixels is lower than a predetermined value, it may be determined as NO in step S711.

A region that is included in pixel regions subjected to specific pixel determination and that is likely to be a paper white region may be excluded from a target for specific pixel determination in step S710, thus increasing processing speed. The term "region that is likely to be a paper white region" as used herein refers to a region that is likely to have been correctly subjected to replacement such that luminance values set by replacement are within a predetermined range from the average luminance value. In addition to increasing the processing speed, such processing can prevent a shade estimation error caused by noise pixels from spreading over a large area due to the repeated processing.

Figure 9:
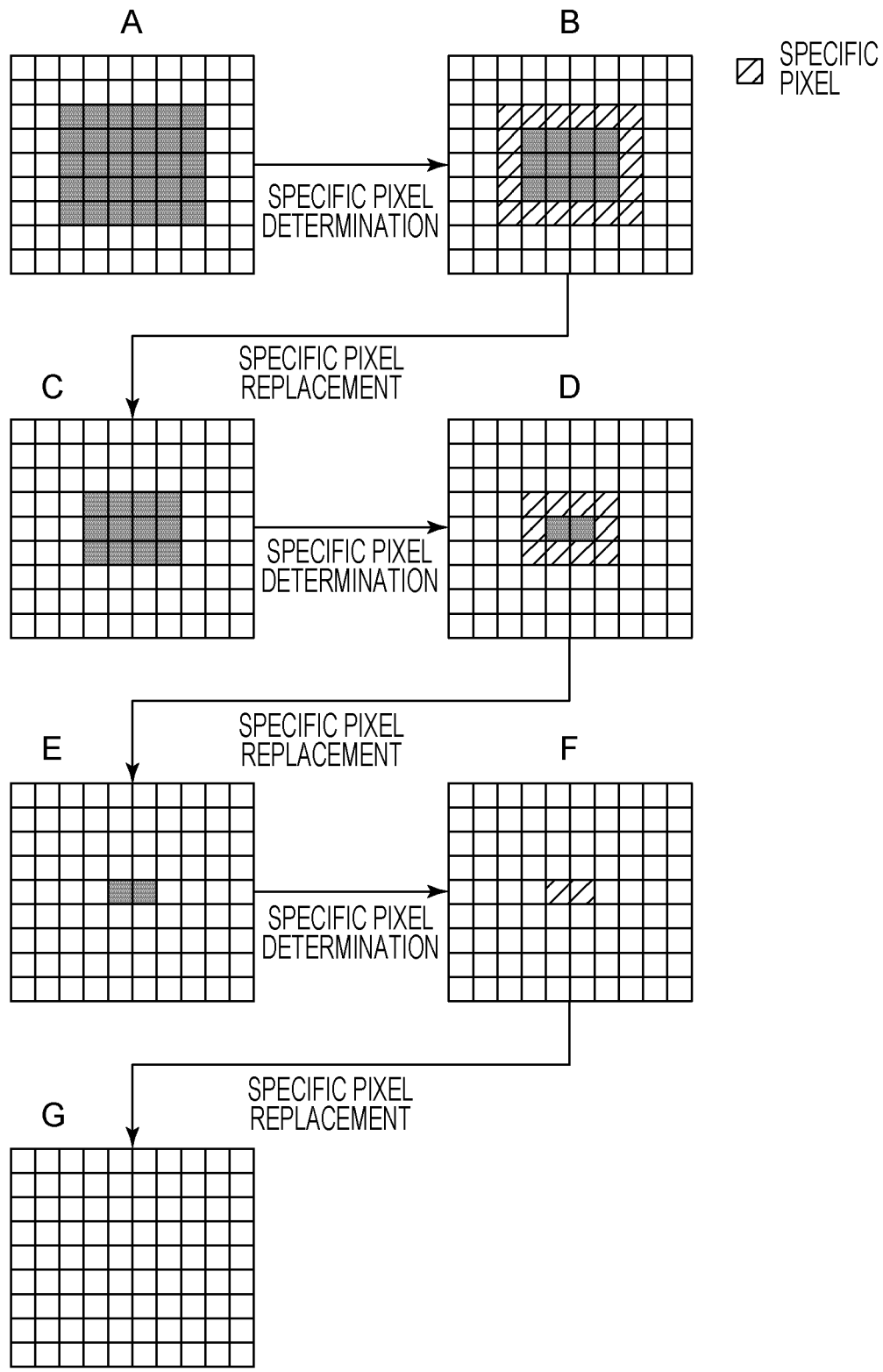
FIG. 9 illustrates an example of correction of specific pixels in the first embodiment.

FIG. 9 illustrates an exemplary processing flow. Part A of FIG. 9 illustrates a first input image in step S709. The input image includes a rectangular object region, in which pixel values do not indicate correct shade-component estimated values. An uncolored portion corresponds to a paper white region, in which correct shade components are estimated. Part B of FIG. 9 illustrates a result of specific pixel determination in steps S709 and S710. In part B, a hatched portion corresponds to pixels determined as specific pixels. Pixels in an edge portion of the rectangular region are determined as specific pixels. Part C of FIG. 9 illustrates a result of replacement of the specific pixels with pixels in the paper white region surrounding the specific pixels in step S712. Although the rectangular object region remains, this region is reduced in size as seen from part C of FIG. 9. The image of part C of FIG. 9 corresponds to a second input image in step S709. Part D of FIG. 9 illustrates a result of second specific pixel determination in steps S709 and S710. Part E of FIG. 9 illustrates a result of second replacement of specific pixels with pixels in a paper white region surrounding the specific pixels in step S712. As seen from part E of FIG. 9, the rectangular region is further reduced in size. The image of part E of FIG. 9 corresponds to a third input image in step S709. Part F of FIG. 9 illustrates a result of third specific pixel determination in steps S709 and S710. Part G of FIG. 9 illustrates a result of third replacement of specific pixels with pixels in a paper white region surrounding the specific pixels in step S712. As seen from part G of FIG. 9, the rectangular region has disappeared. Although the image of part G of FIG. 9 corresponds to a fourth input image in step S709, specific pixel determination is not performed in steps S709 and S710, the number of specific pixels is determined as zero in step S711, the process branches to step S714, and the repeated processing is then terminated. This repeated processing enables replacement in a large object region using neighboring pixels with no problems.

In step S714, the image processing unit 309 determines a gain adjustment value for a luminance component based on fundamental color information. For example, assuming that the fundamental color is white, the area of a paper white region is large and shade components can be accurately estimated based on an input image. Since the estimated shade components are indicated by representative values of respective blocks, some blocks may include darker shade. The gain adjustment value is therefore determined to enhance shade removal (or make the image brighter) in accordance with a shade luminance component distribution. When the fundamental color is not white, there is no or little paper white region. The accuracy of shade estimation may be low, such that estimated shade components are likely to include a background or an object color. If the estimated shade components are simply removed, overcorrection would be caused. The gain adjustment value is therefore determined so that shade removal based on the shade luminance component distribution is moderately performed to prevent excessive conversion. In step S715, the image processing unit 309 multiplies a luminance value of each of the pixels included in the reduced image by the gain adjustment value determined in step S714, thus converting the luminance component value of each pixel.

In step S716, the image processing unit 309 replaces the color component value of each of the pixels with the color component representative value determined in step S702 or S703.

The above-described process removes an object element from the reduced image to generate an image with a converted shade component distribution. The image finally generated is an RGB image. Since luminance components and color components are subjected to correction and replacement during the process, the image may be converted into a YCbCr image, the YCbCr image may be subjected to the process of FIG. 7, and the processed image may be finally converted into an RGB image. Alternatively, YCbCr values may be calculated from RGB values on a pixel-by-pixel basis in each of the steps. If YCbCr values are corrected, the corrected values may be converted into RGB values.

According to the first embodiment, shade components can be accurately estimated, so that shade can be removed based on information about the estimation. In particular, the luminance value of a specific pixel representing an edge that suggests the presence of an object is replaced with a value calculated from luminance values of pixels having highly reliable shade-component estimated values and being brighter than neighboring specific pixels. Then, specific pixel determination is again performed and the luminance value of a determined specific pixel is replaced with a calculated value. Such processing is repeated. Consequently, if an image includes a large object, shade in the image can be accurately estimated.

Second Embodiment

In the first embodiment, specific pixel determination is repeated until there is no pixel to be subjected to specific pixel determination. In some cases, an input image may include a small region brighter than most other regions of a document. For example, such a bright region may be caused due to reflection upon image capture. If a colored sheet with an adhesive note brighter than the colored sheet is captured as an image, an input image may include such a small region brighter than most other regions of a document. In such a case, replacement processing for specific pixels would result in a reduction in accuracy of shade component estimation.

In an input image including a region affected by reflection upon image capture, the region is "whiteout". In a reduced image composed of representative pixel values, the whiteout region includes brighter pixels than neighboring pixels. If the neighboring pixels are included in a paper white region, the neighboring pixels would be included in an edge region, or would be determined as specific pixels. If the neighboring pixels in the paper white region have values correctly estimated as shade components, the values would be replaced with values of bright pixels in the whiteout region, resulting in a reduction in accuracy of shade component estimation.

As regards an input image including a small region brighter than most other regions of a document, in a reduced image composed of representative pixel values, pixel values of pixels surrounding the small region are replaced with pixel values of the small region. If the small region is a paper white region, pixel values of its surrounding large region of, for example, a colored sheet, would be replaced with pixel values of the small region by performing repeated processing based on information about the small region. Since replacement source information would include only the information about the pixel values of the small region and the amount of information would be small, the accuracy of shade component estimation would be reduced.

Figure 10:
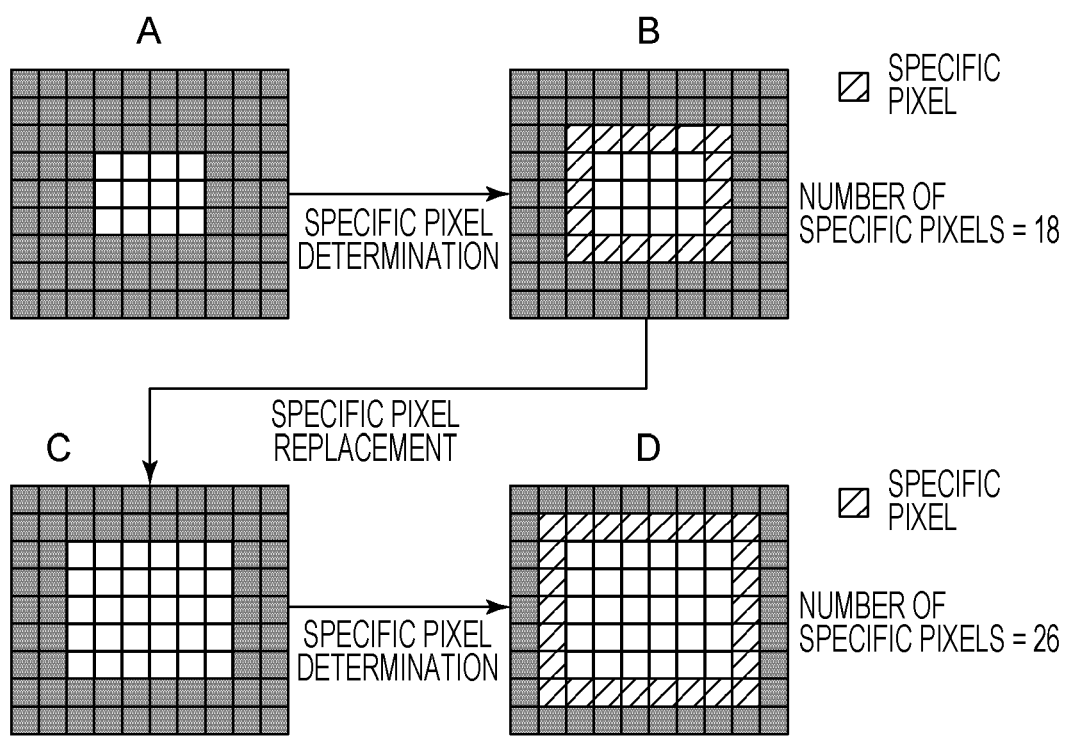
FIG. 10 illustrates an example of correction of specific pixels in a second embodiment.

In the above-described cases, a reduced image composed of representative pixel values often has luminance values as illustrated in part A of FIG. 10. In other words, a bright region is surrounded by a dark region. In such a case, pixels surrounding the bright region are determined as specific pixels, and a pixel value of each of the specific pixels is replaced with a luminance value calculated from the bright region. Parts B, C, and D of FIG. 10 illustrate replacement. Specifically, pixels surrounding the bright region are determined as specific pixels, a luminance value of each of the specific pixels is replaced with a value calculated from luminance values of the bright region, and pixels surrounding the resultant bright region are then determined as specific pixels. Such processing is repeated. In this repeated processing, the number of pixels determined as specific pixels increases. For example, the number of specific pixels is 18 in part B of FIG. 10, whereas the number of specific pixels is 26 in part D of FIG. 10. This problem is particular to such arrangement in which a bright region is surrounded by a dark region. Typically, a dark region is surrounded by a bright region and the above-described problem is not caused. According to a second embodiment, repeated specific pixel determination is aborted in the above case, thus increasing the accuracy of shade component estimation.

Figure 11:
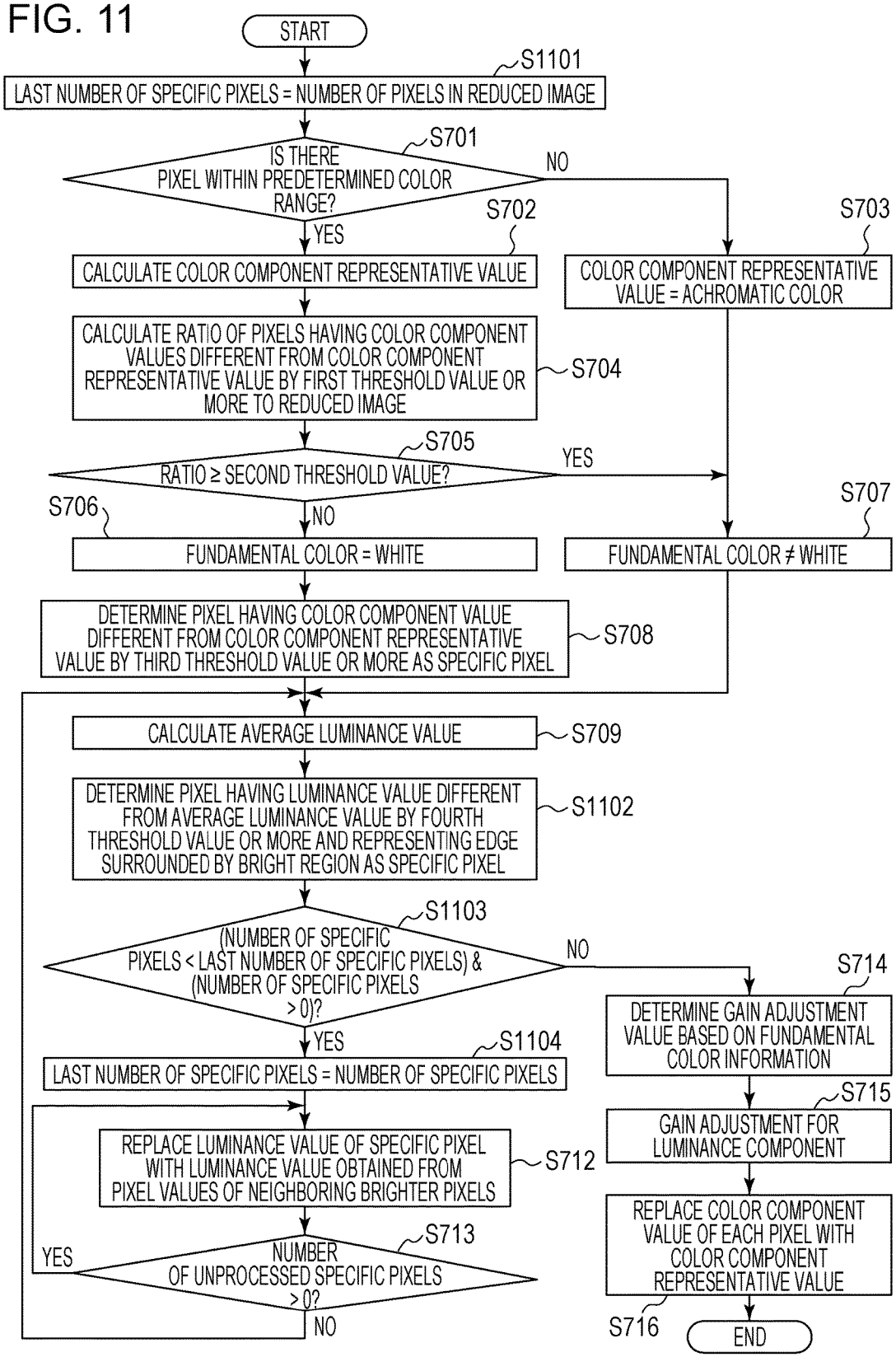
FIG. 11 is a flowchart illustrating a process in the second embodiment.

FIG. 11 is a flowchart explaining details of the reduced image correction process (S700) in the second embodiment. In FIG. 11, steps different from those in the flowchart of FIG. 7 are steps S1101 to S1104. These different steps will now be described.

In step S1101, the image processing unit 309 sets the last number of specific pixels to the number of pixels in the reduced image. This processing corresponds to initialization of a variable to be used in later processing.

In step S1102, the image processing unit 309 performs the same processing as that in step S710 except for the edge determination method. Unlike in step S710, the edge determination method in step S1102 is performed in consideration of geometrical conditions upon edge determination. When many pixels adjacent to a pixel determined as a dark edge pixel have pixel values similar to a pixel value of the determined pixel to form a relatively large region, dark edge determination is disabled because there is a high possibility that a bright region may be surrounded by a dark region as described above.

Figure 12A:
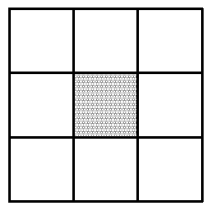
FIGS. 12A to 12E illustrate examples of edge determination results.
Figure 12B:
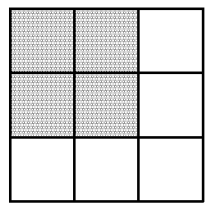
Figure 12C:
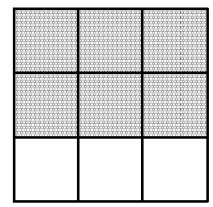
Figure 12D:
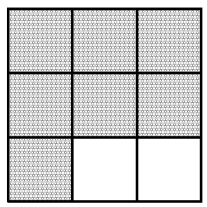
Figure 12E:
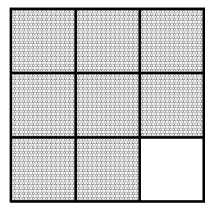

FIGS. 12A to 12E illustrate examples of edge determination results. The edge determination includes calculating a difference in luminance value between a target pixel and each of pixels adjacent to the target pixel. When the luminance value of the target pixel is lower than that of the adjacent pixel by a predetermined threshold value or more, the target pixel is determined as a dark edge pixel. The target pixel may be determined as a dark edge pixel by comparing with multiple adjacent pixels. For example, FIG. 12A illustrates a case where a target pixel is determined as a dark edge pixel by comparing with all of the adjacent pixels. In this case, the dark edge pixel is isolated, or surrounded by bright pixels. FIG. 12B illustrates dark edge determination by comparison with five pixels. FIG. 12C illustrates dark edge determination by comparison with three pixels. In these cases, dark edge pixels are not surrounded by bright pixels, and a bright region is not surrounded by a dark region. FIG. 12D illustrates dark edge determination by comparison with two pixels. FIG. 12E illustrates dark edge determination by comparison with one pixel. These cases suggest that a bright region is surrounded by a dark region including pixels similar to the pixels determined as dark edge pixels. In such a case, dark edge determination is disabled to prevent specific pixel determination. This prevents the accuracy of shade component estimation from being reduced due to replacement processing for specific pixels.

In step S1103, the image processing unit 309 determines whether the number of specific pixels, determined in steps S708 and S1102, is less than the last number of specific pixels. If YES, the process proceeds to step S1104. If NO, replacement processing for specific pixels is terminated or aborted. The process proceeds to step S714. Step S1103 includes determination as to whether the number of specific pixels is less than the last number of specific pixels in addition to determination in step S711. As described above, when bright pixels are surrounded by dark pixels as illustrated in FIG. 10, the number of specific pixels increases. In this case, the replacement processing for specific pixels is aborted, thus preventing the accuracy of shade component estimation from being reduced due to inappropriate replacement processing.

In step S1104, the image processing unit 309 sets the latest number of specific pixels to the last number of specific pixels for the next determination in step S1103.

According to the second embodiment, if an input image includes a small region brighter than most other regions of a document, the accuracy of shade component estimation can be prevented from being reduced by replacement processing for specific pixels. Thus, the accuracy of shade component estimation can be improved. Furthermore, shade can be accurately removed based on information about the estimation.

According to the present disclosure, if a document includes an object having a large area, shade in a captured image can be estimated accurately.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-140041, filed Jul. 13, 2015, which is hereby incorporated by reference herein in its entirety.

What is claimed is:

1. A method for processing information, the method comprising:
   determining, in a luminance image that represents luminance components of an input image obtained by capturing a document image, a shaded region affected by shade and a specific pixel region including specific pixels less affected by the shade through a color of an object in the document image by using the luminance components of pixels of the luminance image; and
   generating a shade image that represents shade components of the input image by referring to pixel values of pixels adjacent to the specific pixels and replacing a pixel value of each of the specific pixels with a value of the shaded region adjacent to the specific pixel,
   wherein in the generating, replacing a pixel value of each of the specific pixels with the value of the adjacent shaded region is repeated until the specific pixel region disappears in the luminance image.

2. The method according to claim 1, wherein the specific pixels each have a color component different from a color component of the shade in the luminance image by a predetermined threshold value or more.

3. The method according to claim 1, further comprising:
   segmenting the input image into a plurality of blocks;
   obtaining a representative value of each of the blocks based on luminance components of pixels in the block; and
   generating an image using the obtained representative values of the blocks,
   wherein the luminance image in the determining represents luminance components of the image generated in the generating.

4. The method according to claim 1, wherein the specific pixels represent an edge in the luminance image.

5. An information processing apparatus comprising:
   a memory storing instructions; and
   one or more processors which execute the instructions and cause the information processing apparatus to function as:
   a determining unit configured to determine, in a luminance image that represents a luminance component of an input image obtained by capturing a document image, a shaded region affected by shade and a specific pixel region including specific pixels less affected by the shade through a color of an object in the document image by using the luminance components of pixels of the luminance image; and
   a generating unit configured to generate a shade image that represents shade components of the input image by referring to pixel values of pixels adjacent to the specific pixels and replacing a pixel value of each of the specific pixels with a value of the shaded region adjacent to the specific pixel,
   the generating unit repeats replacing a pixel value of each of the specific pixels with the value of the adjacent shaded region until the specific pixel region disappears in the luminance image.

6. A non-transitory computer-readable recording medium storing a program that causes a computer to execute the method according to claim 1.

* * * * *